United States Patent
Gador et al.

(10) Patent No.: US 9,430,625 B1
(45) Date of Patent: Aug. 30, 2016

(54) METHOD AND SYSTEM FOR VOICE MATCH BASED DATA ACCESS AUTHORIZATION

(71) Applicant: Intuit Inc., Mountain View, CA (US)

(72) Inventors: Brandon Gador, San Francisco, CA (US); Jacob Rozin, San Francisco, CA (US); Colin J. Roper, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 129 days.

(21) Appl. No.: 14/030,012

(22) Filed: Sep. 18, 2013

(51) Int. Cl.
   *G06F 11/00* (2006.01)
   *G06F 21/32* (2013.01)

(52) U.S. Cl.
   CPC .................................. *G06F 21/32* (2013.01)

(58) Field of Classification Search
   CPC ........................... G06F 21/31; G06F 21/6218
   USPC .......................................................... 726/17
   See application file for complete search history.

(56) References Cited

U.S. PATENT DOCUMENTS

| | | | | |
|---|---|---|---|---|
| 8,332,223 B2 * | 12/2012 | Farrell | ............... | G07C 9/00158 379/88.03 |
| 8,649,766 B2 * | 2/2014 | Kemshall | ................ | G06F 21/40 455/410 |
| 2003/0163739 A1 * | 8/2003 | Armington | ............. | G06F 21/32 726/3 |
| 2007/0241861 A1 | 10/2007 | Venkatanna et al. | | |
| 2009/0182634 A1 | 7/2009 | Park et al. | | |
| 2009/0249077 A1 | 10/2009 | Gargaro et al. | | |
| 2009/0288148 A1 * | 11/2009 | Headley | ................ | H04L 9/3271 726/5 |
| 2010/0275010 A1 | 10/2010 | Ghirardi | | |
| 2013/0014248 A1 | 1/2013 | McLaughlin et al. | | |
| 2014/0230039 A1 | 8/2014 | Prakash et al. | | |

OTHER PUBLICATIONS

"Jul. 2015 Update: Interim Eligibility Guidance Quick Reference Sheet." (http://www.uspto.gov/patents/law/exam/2014_eligibility_qrs.pdf).*
Gador et al., "Method and System for Image Based Data Access Authorization," U.S. Appl. No. 13/974,926, filed Aug. 23, 2013.

* cited by examiner

*Primary Examiner* — Eleni Shiferaw
*Assistant Examiner* — David Massie
(74) *Attorney, Agent, or Firm* — Hawley Troxell Ennis & Hawley LLP; Philip McKay

(57) ABSTRACT

A request is received to access protected data from a data access requesting party. Authentication text to be read aloud is then generated and transferred to a first computing system associated with the data access requesting party. The authentication text is then displayed on the first computing system. The access requesting party is then requested to read the authentication text aloud and first audio data is obtained from a first audio detection capability associated with the first computing system and second audio data is obtained from a second audio detection capability associated with a second computing system associated with a data access requesting party. The authentication text is then compared to the first audio data and the second audio data and, if the data matches, the data requesting party is provided access to the protected data.

19 Claims, 2 Drawing Sheets

METHOD AND SYSTEM FOR VOICE MATCH BASED DATA ACCESS AUTHORIZATION

BACKGROUND

Every year more and more of the world's data is processed and stored in remote locations using "cloud-based" architectures. In addition, mobile computing systems, such as smart phones, are often the preferred mechanism for accessing data. Consequently, protecting access to sensitive data and information has become increasingly difficult and critical. This is particularly true in light of the fact that unauthorized parties, e.g., hackers, recognizing the situation, have become more and more sophisticated and determined to gain access to sensitive data.

As a result of the situation described above, many providers of databases containing sensitive data, such as financial institutions and providers of financial management systems, are highly motivated to find additional ways to prevent unauthorized users from accessing their customer's accounts. To answer this need, multi-factor authentication systems have been developed that require a party requesting access to sensitive data to provide two or more types of authentication before they are granted access to the sensitive data. However, in light of the migration to mobile computing discussed above, many multi-factor authentication methods currently used to protect sensitive data are difficult to implement, and, in some cases, are simply impractical.

As one example, one multi-factor authentication method currently used to protect sensitive data in remote databases is to generate one-time passcodes that are sent to a data requesting party's telephone, or other computing system. However, the passcodes can be difficult to read, hear, or otherwise obtain. In addition, legitimate database users often mistakenly miss-key the passcodes, and/or otherwise make data entry mistakes, when entering the supplied passcodes into the database access websites. Unfortunately, this generally means the process must be repeated from the beginning and a new passcode must be generated, provided, and entered once access is denied due to a miss-keyed passcode. This is an inconvenient and annoying situation for legitimate database users trying to assess their own sensitive data.

What is needed is a method and system for providing multi-factor authentication that does not require the use of keyed-in passcodes, is simple to use, and leverages the fact that most data access requesting parties have access to two or more computing systems, and/or mobile computing systems.

SUMMARY

In accordance with one embodiment, a system and method for voice match based data access authorization includes providing a database that includes protected data. In one embodiment, when access request data is received from an access system associated with a data access requesting party, authentication text data representing one or more words, or symbols, to be read aloud by the data access requesting party is generated and transferred to a first computing system associated with the data access requesting party. In one embodiment, the one or more words, or symbols, represented by the authentication text data are then displayed on a display device associated with the first computing system.

In one embodiment, a first audio detection capability on the first computing system is activated along with a second audio detection capability on a second computing system associated with the data access requesting party. In one embodiment, the data access requesting party is then requested to read aloud the one or more words, or symbols, represented by the authentication text data displayed on the display device associated with the first computing system. First audio data is obtained from the first audio detection capability and second audio data is obtained from the second audio detection capability representing the data requesting party's reading the one or more words, or symbols, represented by the authentication text data aloud.

In one embodiment, the authentication text data is then compared to the first audio data and the second audio data and, if the authentication text data, the first audio data, and the second audio data, match to a defined threshold tolerance, the access request computing system associated with the data requesting party is provided access to the protected data in the database.

Figure 1:
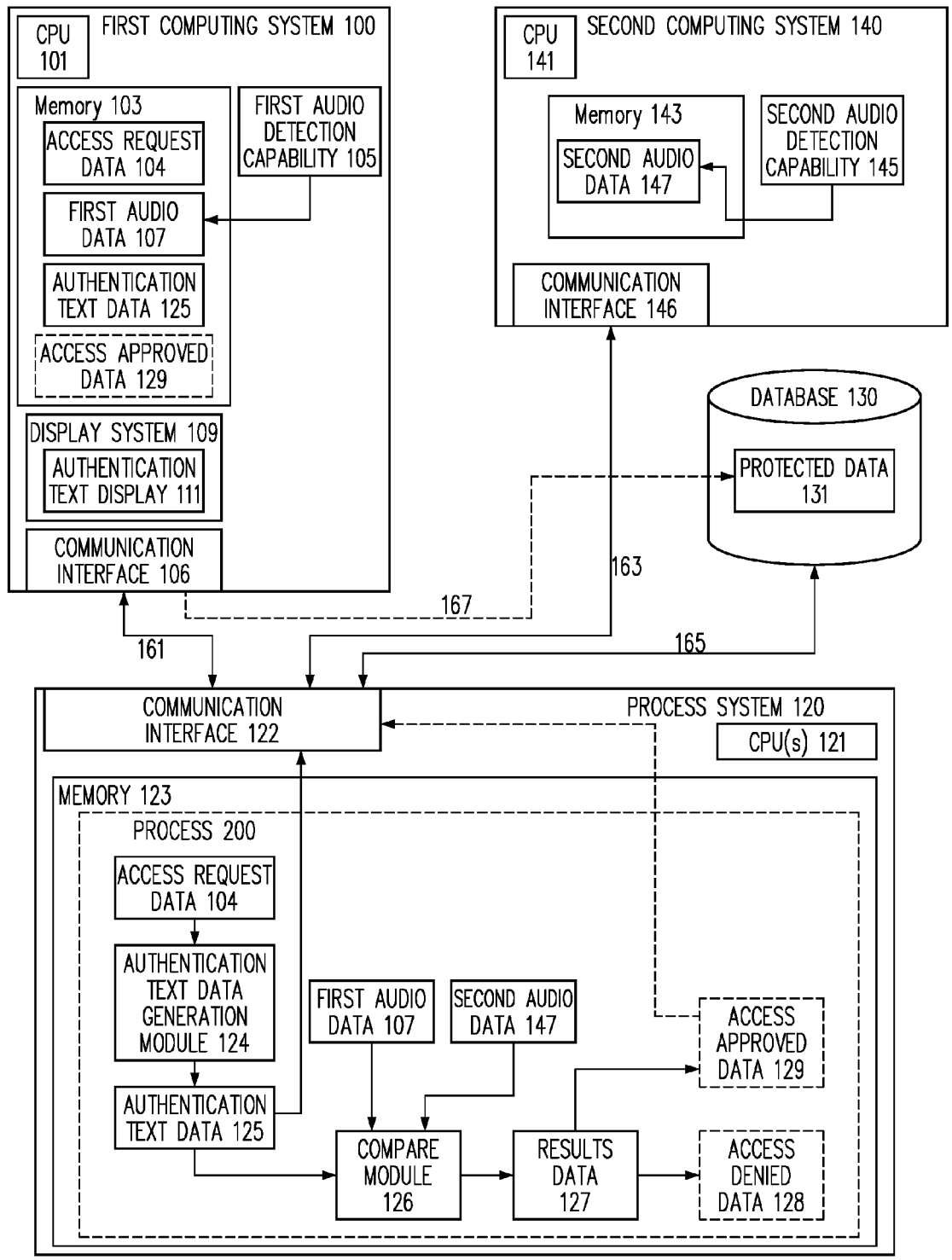
FIG. 1 is a block diagram of an exemplary hardware architecture for implementing one embodiment.

Common reference numerals are used throughout the FIGs. and the detailed description to indicate like elements. One skilled in the art will readily recognize that the above FIGs. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

In one embodiment, a process for voice match based data access authorization includes one or more applications, such as software packages, modules, or systems, implemented on two or more computing systems.

In one embodiment, one or more of the computing systems is/are a mobile computing system such as a smart phone, or other mobile device, including an integrated audio detection/capture capability, e.g., an audio detection capability. However, as used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment a database that includes protected data is provided. As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, the database is associated with one or more data management systems and includes protected data associated with, obtained by, or generated by, a data management system. As used herein, the term "data management system" includes, but is not limited to: computing system implemented, and/or online, business and/or personal financial management systems, packages, programs, modules, or applications; computing system implemented, and/or online, business and/or personal tax preparation systems, packages, programs, modules, or applications; computing system implemented, and/or online, business and/or personal accounting and/or invoicing systems, packages, programs, modules, or applications; computing system implemented, and/or online, banking systems, packages, programs, modules, or applications; and various other electronic data management systems, packages, programs, modules, or applications, whether known at the time of filling or as developed later.

Herein, a computing system implemented financial management system can be, but is not limited to, any of the following: a computing system implemented personal and/or business financial transaction management system; a computing system implemented personal and/or business financial management system; a computing system implemented personal and/or business asset management system; a computing system implemented personal and/or business accounting system; a computing system implemented point of sale system; and/or any of the numerous computing system implemented financial management systems known to those of skill in the art.

In one embodiment, various legitimate database users of the database and/or data management system need to access the protected data in the database remotely. However, given the potentially highly sensitive nature of the protected data, extreme care must be taken to prevent unauthorized parties, e.g., hackers, from accessing the protected data. To this end, in one embodiment, when a legitimate database user signs up for the process for voice match based data access authorization, and/or an associated data management system, the legitimate database user provides identification and authentication data, such as a system ID, user ID, and password data, associated with an access system associated with the legitimate database user, and/or a first computing system associated with the legitimate database user, including a first audio detection capability, and/or a second computing system associated with the legitimate database user, including a second audio detection capability, one of which the legitimate database user intends to use to access the protected data.

In some embodiments, the access system is the first computing system associated with the legitimate database user, and/or the access system is the second computing system associated with the legitimate database user. In other embodiments, the access system is a third computing system associated with the legitimate database user.

In one embodiment, when access request data is received by the process for voice match based data access authorization indicating that a data access requesting party, either a legitimate database user or a hacker, is requesting access to the protected data, authentication text data representing one or more words, or symbols, to be read aloud by the data access requesting party is generated and transferred to a first computing system associated with the data access requesting party.

In various embodiments, the authentication text data includes data representing one or more of, but not limited to, a randomly generated phrase, slogan, or even a nonsensical string of words; one or more symbols, such as numerals, letters, mathematical symbols, operation symbols, etc., that have widely and commonly accepted names; and/or any text or symbols that can either be read or described using widely and commonly accepted terms.

In one embodiment, data indicating the words, and or symbols, represented in the authentication text data is stored locally, i.e., data representing a correct response is stored locally, while a copy of the authentication text data, i.e., challenge data, is transferred to the first computing system associated with the data requesting party. In various embodiments, the first computing system associated with the data requesting party can be any computing system including a first audio capture/detection capability, i.e., a first audio detection capability, as discussed herein, and/or as known in the art at the time of filing, and/or as developed after the time of filing. In one embodiment, the first computing system is not necessarily a computing system owned by the data requesting party, controlled by the data requesting party, and/or registered with the process for voice match based data access authorization. All that is required of the first computing system is that the first computing system be accessible by the data requesting party.

In one embodiment, once the authentication text data is transferred to the first computing system, the words and/or symbols represented by the authentication text data are displayed on a display device associated with the first computing system.

In one embodiment, a first audio detection capability on the first computing system is then activated. In one embodiment, the first audio detection capability on the first computing system is activated automatically by the process for voice match based data access authorization. In other embodiments, the first audio detection capability is activated by the data requesting party, in one embodiment, at the request of the process for voice match based data access authorization.

In one embodiment, the data requesting party is then requested by the process for voice match based data access authorization to access and activate a second computing system associated with the data access requesting party. In one embodiment, the second computing system associated with the data access requesting party is a computing system previously registered with the process for voice match based data access authorization. In one embodiment, the second computing system associated with the data access requesting party is a mobile computing system, such as a smart phone, whose telephone number, and/or email address, and/or text message phone number, is already registered with, and/or known by, the process for voice match based data access authorization. Consequently, in these embodiments, the second computing system is known to be associated with the data access requesting party, and/or is registered with the process for voice match based data access authorization.

In one embodiment, the second computing system includes a second audio capture/detection capability, i.e., a second audio detection device. In one embodiment, the second audio detection capability on the second computing system associated with the data access requesting party is activated. In one embodiment, the second audio detection capability is activated automatically by the process for voice match based data access authorization. In other embodiments, the data requesting party is required to activate the second audio detection capability.

Consequently, in one embodiment, the words and/or symbols of the authentication text data are displayed on the first computing system and the separate audio detection capabilities associated with the first and second computing systems are activated and readied to record audio detection data.

In one embodiment, the data access requesting party is then requested by the process for voice match based data access authorization to read aloud the one or more words, or symbols, represented by the authentication text data displayed on the display device associated with the first computing system.

In various embodiments, the data access requesting party is requested to read aloud the one or more words, or symbols, represented by the authentication text data via one or more pop-up displays on the display device of the first computing system, and/or an email message, and/or an SMS or other text-based message, and/or by any other means, mechanism, process, or procedure for requesting the one or more words or symbols represented by the authentication data be read aloud by the data requesting party.

In one embodiment, as the data requesting party is reading aloud the words, and/or symbols, represented in the authentication text data, first audio data is captured/obtained by the first audio detection capability associated with the first computing system. Likewise, as the data requesting party is reading aloud the words, and/or symbols, represented in the authentication text data, second audio data is captured/obtained by the second audio detection capability associated with the second computing system.

In one embodiment, the first audio data and second audio data is then transferred to, or otherwise obtained by, the process for voice match based data access authorization.

In one embodiment, the authentication text data. e.g., data indicating the words, and or symbols, represented in the authentication text data previously stored locally by the process for voice match based data access authorization, the first audio data, and the second audio data, are analyzed and compared.

In one embodiment, the authentication data is compared with the first audio data and, if the first audio data matches the authentication data to a threshold degree, the first audio data is designated as authenticated first audio data. Likewise, in one embodiment the authentication data is compared with the second audio data and, if the second audio data matches the authentication data to threshold degree, the second audio data is designated as authenticated second audio data. In this embodiment, once the first audio data and second audio data are designated as authenticated audio data, the status data associated with the data requesting party is transformed into status data indicating the data requesting party is an authenticated legitimate user of the protected data in the database, i.e., the data requesting party is identified as a legitimate database user.

In one embodiment, the first audio data and second audio data are compared with each other, and the authentication data, and if the first audio data, the second audio data, and the authentication data match to a threshold degree, the status data associated with the data requesting party is transformed into status data indicating the data requesting party is an authenticated legitimate user of the protected data in the database, i.e., the data requesting party is identified as a legitimate database user.

In one embodiment, the first audio data and second audio data are compared with each other, and if the first audio data and the second audio data match to a threshold degree, the status data associated with the data requesting party is transformed into status data indicating the data requesting party is an authenticated legitimate user of the protected data in the database, i.e., the data requesting party is identified as a legitimate database user.

In one embodiment, once the status data associated with the data requesting party is transformed into status data indicating the data requesting party is an authenticated legitimate user of the protected data in the database, i.e., the data requesting party is identified as a legitimate database user, the access system, and/or the identified legitimate user of the protected data in the database, is provided access to the protected data in the database.

On the other hand, if the data access requesting party cannot be identified as a legitimate user of the protected data in the database by any of the methods discussed above, the data requesting party is denied access to the protected data in the database.

As a specific illustrative example of one embodiment, assume that a legitimate database user has previously enrolled with the process for voice match based data access authorization. Consequently, the process for voice match based data access authorization has obtained the legitimate database user's phone number associated with the legitimate database user's second computing system, in this specific illustrative example, a smart phone.

In this specific illustrative example, the database and protected data are associated with an on-line banking system and the legitimate database user wants to login to his online banking account. In this specific illustrative example, the legitimate database user visits his online banking site via his laptop, i.e., his access system, and, in this embodiment, the first computing system associated with legitimate database user. Further assume the legitimate database user clicks "log in" to view his balances. This initiates the transfer of access request data from the legitimate database user's laptop to the process system, i.e., a process/gateway server, implementing the process for voice match based data access authorization.

At this point, the process server generates random text data represented by authentication text data in the form of the sentence "Jack and Jill went up the hill" and, in this specific illustrative example, the authentication text data is sent to the legitimate database user's laptop display and the sentence "Jack and Jill went up the hill" is displayed on the laptop display screen.

An audio detection/capture capability associated with the laptop is then activated, e.g., the laptop's microphone is turned on. In this specific illustrative example, a message is then sent to the legitimate database user via an SMS message sent to the smart phone associated with the legitimate database user, i.e., the second computing system associated with the legitimate database user, asking the legitimate database user to activate a second audio detection/capture capability associated with the smart phone i.e., to turn on a microphone associated with the smart phone.

In this specific illustrative example, the legitimate database user is then instructed to read the sentence "Jack and Jill went up the hill" out loud within voice range of both the first audio detection capability associated with the laptop and the second audio detection capability associated with the smart phone. In this specific illustrative example, both the first audio detection capability associated with the laptop and the second audio detection capability associated with the smart phone capture audio data representing the legitimate database user reading the sentence "Jack and Jill went up the hill" out loud.

In this specific illustrative example, the first audio data captured by the first audio detection system associated with the laptop and the second audio data captured by the second audio detection system associated with the smart phone are both transferred to a computing system, such as a server system, associated with the process for voice match based data access authorization.

In this specific illustrative example, the first audio data is compared with a copy of the authentication text data maintained by the process for voice match based data access authorization and is found to match the authentication text data. Likewise, in this specific illustrative example, the second audio data is compared with the copy of the authentication text data and found to match the authentication text data. Consequently, in this specific illustrative example, the first audio data and second audio data are designated as authenticated audio data, and the legitimate database user is identified/authenticated, as a legitimate user of the protected data in the database. Therefore, the legitimate database user is provided access to the protected data in the database.

Using the method and system for voice match based data access authorization discussed herein, a method and system for providing multi-factor authentication is provided that does not require the use of keyed-in passcodes, is simple to use, and leverages the fact that most legitimate database users have access to two or more computing systems, and/or mobile computing systems with an audio capture/detection capability.

Consequently, using the method and system for voice match based data access authorization discussed herein, data can be protected in a manner that does not place a significant burden on the legitimate database users, but has the ability to thwart the vast majority of hackers.

Hardware System Architecture

FIG. 1 is a block diagram of an exemplary hardware architecture for implementing one embodiment of process 200 for voice match based data access authorization, such as exemplary process 200 (FIG. 2) discussed herein.

Shown in FIG. 1 is first computing system 100, e.g., a first computing system associated with a data requesting party including a first audio detection capability; a second computing system 140, e.g., a second computing system, such as a smart phone or other mobile computing system, associated with a data requesting party and including a second audio detection capability; a process system 120, e.g., a computing system such as a server system implementing process 200 for voice match based data access authorization and acting as a gateway to protected data 131 in database 130; a database 130, e.g., any data store or database containing protected data 131; and communication channels 161, 163, 165, and 167.

In one embodiment, first computing system 100 includes CPU 101, memory 103, first audio detection capability 105, display system 109, and communications interface 106. As seen in FIG. 1, memory 103 includes access request data 104, first audio data 107, authentication text data 125, and, conditionally, access approved data 129. As also seen in FIG. 1, display system 109 includes authentication text display 111.

In various embodiments, first computing system 100 is any computing system as discussed herein, and/or as known in the art at the time of filing, and/or as developed thereafter, that includes components that can execute all, or part, of process 200 for voice match based data access authorization in accordance with at least one of the embodiments as described herein.

In one embodiment, second computing system 140 includes CPU 141, memory 143, second audio detection capability 145, and communications interface 146. As seen in FIG. 1, memory 143 includes second audio data 147.

In various embodiments, second computing system 140 is a mobile computing system, such as a smart phone, however, second computing system 140 can be any computing system as discussed herein, and/or as known in the art at the time of filing, and/or as developed thereafter, that includes components that can execute all, or part, of process 200 for voice match based data access authorization in accordance with at least one of the embodiments as described herein.

In one embodiment, process system 120 includes CPU 121, memory 123, and communications interface 122. As seen in FIG. 1, memory 123 includes functionality for implementing at least part of process 200. As also seen in FIG. 1, memory 123 includes access request data 104, as received from first computing system 100 via communication interface 106, communications channel 161, and communication interface 122; authentication text data generation module 124 which generates authentication text data 125; first audio data 107, as received from first computing system 100 via communication interface 106, communications channel 161, and communication interface 122; second audio data 147, as received from second computing system 140 via communication interface 146, communications channel 163, and communication interface 122; compare module 126 which generates results data 127; access approved data 129 and/or access denied data 128.

In various embodiments, process system 120 is any computing system as discussed herein, and/or as known in the art at the time of filing, and/or as developed thereafter, that includes components that can execute all, or part, of process 200 for voice match based data access authorization in accordance with at least one of the embodiments as described herein.

In one embodiment, any, or all, of communication channels 161, 163, 165, and 167 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In various embodiments, database 130 includes protected data 131 and is any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, database 130 is associated with one or more data management systems and includes protected data 131 associated with, obtained by, or generated by, a data management system, such as any data management system discussed herein, and/or as known in the art at the time of filing, and/or as developed after the time of filing.

In one embodiment, various legitimate database users of database 130 and/or a data management system, need to access protected data 131 in the database 130 remotely. However, given the potentially highly sensitive nature of protected data 131, extreme care must be taken to prevent unauthorized parties, e.g., hackers, from accessing protected data 131. To this end, in one embodiment, when a legitimate database user signs up for process 200 for voice match based data access authorization, and/or an associated data management system (not shown), the legitimate database user provides identification and authentication data (not shown), such as a system ID, user ID, and password data, associated with an access system associated with the legitimate database user, shown as first computing system 100 in FIG. 1, and/or a first computing system associated with the legitimate database user, also shown as first computing system 100 in FIG. 1, including a first audio detection capability 105, and/or a second computing system associated with the legitimate database user, shown as second computing system 140 in FIG. 1, including a second audio detection capability 145, one of which the legitimate database user intends to use to access protected data 131.

In the specific illustrative example of FIG. 1, the access system is first computing system 100 associated with the legitimate database user. In other embodiments (not shown) the access system is second computing system 140 associated with the legitimate database user. In other embodiments (not shown), the access system is a third computing system (not shown) associated with the legitimate database user.

In one embodiment, when access request data 104 is received by process system 120 from first computing system 100, via communication interface 106, communications channel 161, and communication interface 122, indicating that a data access requesting party, either a legitimate database user or a hacker, is requesting access to protected data 131, authentication text data generation module 124 generates authentication text data 125 representing one or more words, or symbols, to be read aloud by the data access requesting party. In one embodiment, authentication text data 125 is then transferred to first computing system 100 via communication interface 122, communications channel 161, and communication interface 106.

In various embodiments, authentication text data 125 includes data representing one or more of, but not limited to, a randomly generated phrase, slogan, or even a nonsensical string of words; one or more symbols, such as numerals, letters, mathematical symbols, operation symbols, etc., that have widely and commonly accepted names; and/or any text or symbols that can either be read or described using widely and commonly accepted terms.

In one embodiment, data indicating the words, and or symbols, represented in authentication text data 125 is stored locally, i.e., data representing a correct response is stored locally, while a copy of authentication text data 125, i.e., challenge data, is transferred to first computing system 100.

In various embodiments, first computing system 100 can be any computing system including a first audio capture/detection capability, i.e., first audio detection capability 105, as discussed herein, and/or as known in the art at the time of filing, and/or as developed after the time of filing. In one embodiment, first computing system 100 is not necessarily a computing system owned by the data requesting party, controlled by the data requesting party, and/or registered with process 200 for voice match based data access authorization. All that is required of first computing system 100 is that first computing system 100 be accessible by the data requesting party.

In one embodiment, once authentication text data 125 is transferred to first computing system 100, the words and/or symbols represented by the authentication text data are displayed as authentication text display 111 on a display system 109 associated with first computing system 100.

In one embodiment, first audio detection capability 105 of first computing system 100 is then activated. In one embodiment, first audio detection capability 105 on first computing system 100 is activated automatically by process 200 for voice match based data access authorization. In other embodiments, first audio detection capability 105 on first computing system 100 is activated by the data requesting party, in one embodiment, at the request of process 200 for voice match based data access authorization.

In one embodiment, the data requesting party is then requested by process 200 for voice match based data access authorization to access and activate second computing system 140. In one embodiment, second computing system 140 is a computing system previously registered with process 200 for voice match based data access authorization. In one embodiment, second computing system 140 is a mobile computing system, such as a smart phone, whose telephone number, and/or email address, and/or text message phone number, is already registered with, and/or known by, process 200 for voice match based data access authorization. Consequently, in these embodiments, second computing system 140 is known to be associated with the data access requesting party, and/or is registered with process 200 for voice match based data access authorization.

In one embodiment, second computing system 140 includes a second audio capture/detection capability, i.e., second audio detection capability 145. In one embodiment, second audio detection capability 145 is then activated. In one embodiment, second audio detection capability 145 is activated automatically by process 200 for voice match based data access authorization. In other embodiments, the data requesting party is required to activate second audio detection capability 145.

Consequently, in one embodiment, the words and/or symbols of the authentication text data 125 are displayed on display system 109 of first computing system 100 and the separate audio detection capabilities associated with the first and second computing systems, i.e., first audio detection capability 105 and second audio detection capability 145, are activated and readied to record audio detection data, i.e., first audio data 107 and second audio data 147.

In one embodiment, the data access requesting party is then requested by process 200 for voice match based data access authorization to read aloud the one or more words, or symbols, represented by authentication text data 125 and displayed as authentication text display 111 on display system 109 associated with first computing system 100.

In one embodiment, as the data requesting party is reading aloud the words, and/or symbols, represented in the authentication text display 111, first audio data 107 is captured/obtained by first audio detection capability 105. Likewise, as the data requesting party is reading aloud the words, and/or symbols, represented in the authentication text display 111, second audio data 147 is captured/obtained by second audio detection capability 145.

In one embodiment, first audio data 107 and second audio data 147 is then transferred to, or otherwise obtained by, process 200 for voice match based data access authorization, in one embodiment, via communication interfaces 106 and 146, communication channels 161 and 163, and communication interface 122.

In one embodiment, authentication text data 125, first audio data 107, and second audio data 147, are analyzed and compared by compare module 126 which generates results data 127.

In one embodiment, if authentication text data 125, first audio data 107, and second audio data 147 match to a defined threshold level, or degree, i.e., within a defined threshold tolerance, results data 127 indicates that first audio data 107 and second audio data 147 are as authenticated audio data, and the status data (not shown) associated with the data requesting party is transformed into status data indicating the data requesting party is an authenticated legitimate user of protected data 131 in database 130, i.e., the data requesting party is identified as a legitimate database user.

In one embodiment, once the status data associated with the data requesting party is transformed into status data indicating the data requesting party is an authenticated legitimate user of protected data 131 in database 130, i.e., the data requesting party is identified as a legitimate database user, access approval data 129 is generated and the access system, in this example first computing system 100, and/or the identified legitimate user of the protected data in the database, is provided access to protected data 131 in database 130.

On the other hand, if the data access requesting party cannot be identified as a legitimate user of the protected data in the database by any of the methods discussed above, access denied data 128 is generated and the data requesting party is denied access to protected data 131 in database 130.
Process In accordance with one embodiment, a database is provided that includes protected data. In one embodiment, when access request data is received from an access system associated with a data access requesting party, authentication text data representing one or more words, or symbols, to be read aloud by the data access requesting party is generated and transferred to a first computing system associated with the data access requesting party. In one embodiment, the one or more words, or symbols, represented by the authentication text data are then displayed on a display device associated with the first computing system.

In one embodiment, a first audio detection capability on the first computing system is activated along with a second audio detection capability on a second computing system associated with the data access requesting party. In one embodiment, the data access requesting party is then requested to read aloud the one or more words, or symbols, represented by the authentication text data displayed on the display device associated with the first computing system. First audio data is obtained from the first audio detection capability and second audio data is obtained from the second audio detection capability representing the data requesting party's reading the one or more words, or symbols, represented by the authentication text data aloud.

In one embodiment, the authentication text data is then compared to the first audio data and the second audio data and, if the authentication text data, the first audio data, and the second audio data, match to a defined threshold tolerance, the access request computing system associated with the data requesting party is provided access to the protected data in the database.

Figure 2:
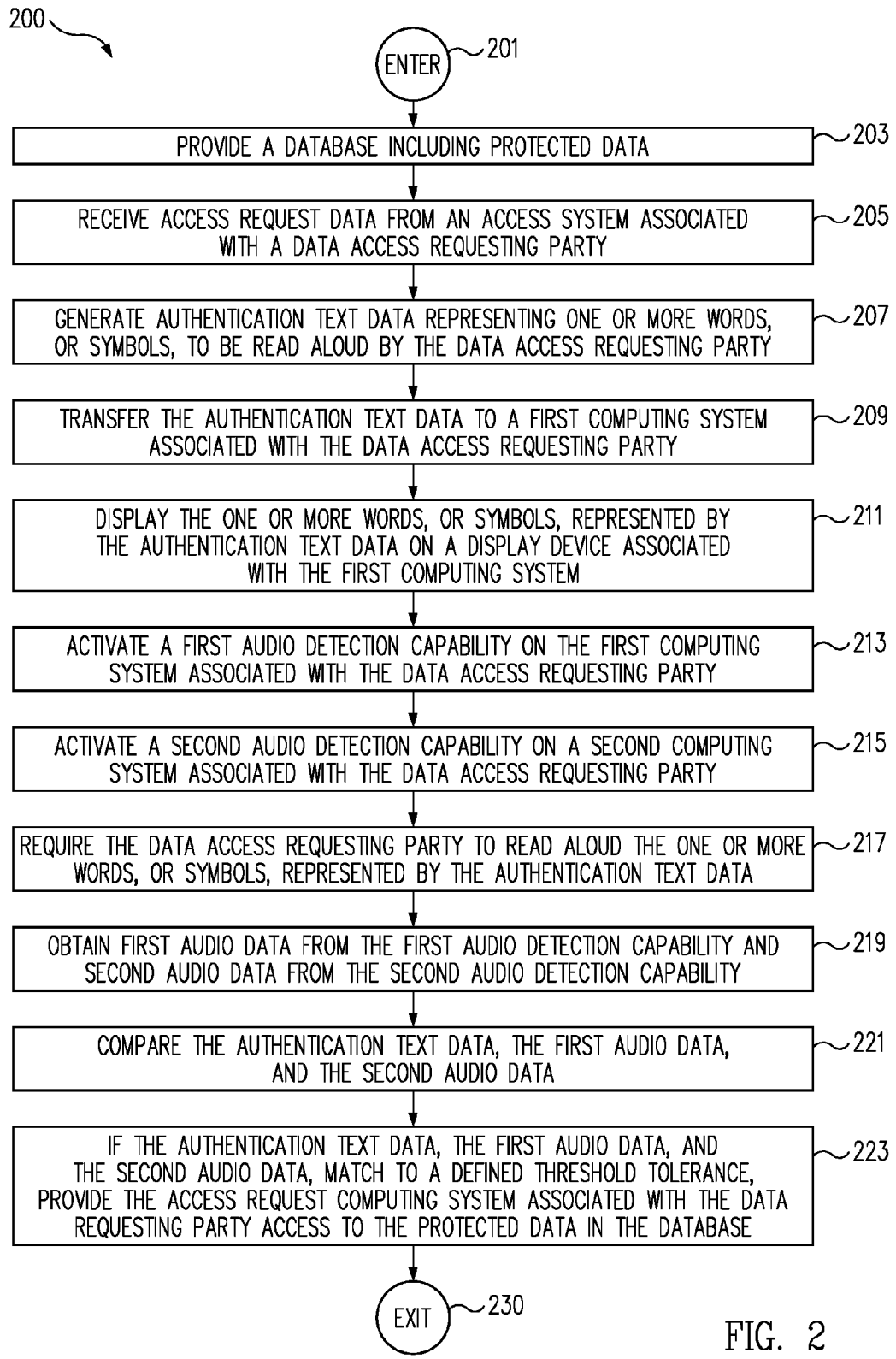
FIG. 2 is a flow chart depicting a process for voice match based data access authorization in accordance with one embodiment.

Process 200 for voice match based data access authorization begins at ENTER OPERATION 201 of FIG. 2 and process flow proceeds to PROVIDE A DATABASE INCLUDING PROTECTED DATA OPERATION 203.

In one embodiment, at PROVIDE A DATABASE INCLUDING PROTECTED DATA OPERATION 203 a database that includes protected data is provided.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, the database of PROVIDE A DATABASE INCLUDING PROTECTED DATA OPERATION 203 is associated with one or more data management systems and includes protected data associated with, obtained by, or generated by, a data management system. As used herein, the term "data management system" includes, but is not limited to: computing system implemented, and/or online, business and/or personal financial management systems, packages, programs, modules, or applications; computing system implemented, and/or online, business and/or personal tax preparation systems, packages, programs, modules, or applications; computing system implemented, and/or online, business and/or personal accounting and/or invoicing systems, packages, programs, modules, or applications; computing system implemented, and/or online, banking systems, packages, programs, modules, or applications; and various other electronic data management systems, packages, programs, modules, or applications, whether known at the time of filling or as developed later.

Herein, a computing system implemented financial management system can be, but is not limited to, any of the following: a computing system implemented personal and/or business financial transaction management system; a computing system implemented personal and/or business financial management system; a computing system implemented personal and/or business asset management system; a computing system implemented personal and/or business accounting system; a computing system implemented point of sale system; and/or any of the numerous computing system implemented financial management systems known to those of skill in the art.

In one embodiment, various legitimate database users of the database and/or data management system of PROVIDE A DATABASE INCLUDING PROTECTED DATA OPERATION 203 need to access the protected data in the database remotely. However, given the potentially highly sensitive nature of the protected data, extreme care must be taken to prevent unauthorized parties, e.g., hackers, from accessing the protected data.

To this end, in one embodiment, when a legitimate database user of PROVIDE A DATABASE INCLUDING PROTECTED DATA OPERATION 203 signs up for process 200 for voice match based data access authorization, and/or an associated data management system, the legitimate database user provides identification and authentication data, such as a system ID, user ID, and password data, associated with an access system associated with the legitimate database user, and/or a first computing system associated with the legitimate database user, including a first audio detection capability, and/or a second computing system associated with the legitimate database user, including a second audio detection capability, one of which the legitimate database user intends to use to access the protected data.

In one embodiment, once a database that includes protected data is provided at PROVIDE A DATABASE INCLUDING PROTECTED DATA OPERATION 203, process flow proceeds to RECEIVE ACCESS REQUEST DATA FROM AN ACCESS SYSTEM ASSOCIATED WITH A DATA ACCESS REQUESTING PARTY OPERATION 205.

In one embodiment, at RECEIVE ACCESS REQUEST DATA FROM AN ACCESS SYSTEM ASSOCIATED WITH A DATA ACCESS REQUESTING PARTY OPERATION 205 a data access requesting party, either a legitimate database user or an unauthorized party, e.g., a hacker, attempts to access the protected data of PROVIDE A DATABASE INCLUDING PROTECTED DATA OPERATION 203 and this action causes access request data to be received by a process system, i.e., a computing system implementing process 200 for voice match based data access authorization.

In one embodiment, the access system of at RECEIVE ACCESS REQUEST DATA FROM AN ACCESS SYSTEM ASSOCIATED WITH A DATA ACCESS REQUESTING PARTY OPERATION 205 is the first computing system associated with the legitimate database user, and/or the access system is the second computing system associated with the legitimate database user. In other embodiments, the access system is a third computing system associated with the legitimate database user.

In one embodiment, once a data access requesting party, either a legitimate database user or a hacker, attempts to access the protected data of PROVIDE A DATABASE INCLUDING PROTECTED DATA OPERATION 203 and access request data is received by process 200 for voice match based data access authorization at RECEIVE ACCESS REQUEST DATA FROM AN ACCESS SYSTEM ASSOCIATED WITH A DATA ACCESS REQUESTING PARTY OPERATION 205, process flow proceeds to GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207.

In one embodiment, at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207, once access request data is received by process 200 for voice match based data access authorization at RECEIVE ACCESS REQUEST DATA FROM AN ACCESS SYSTEM ASSOCIATED WITH A DATA ACCESS REQUESTING PARTY OPERATION 205 authentication text data representing one or more words, or symbols, to be read aloud by the data access requesting party is generated at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207.

In various embodiments, the authentication text data of GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207 includes data representing one or more of, but not limited to, a randomly generated phrase, slogan, or even a nonsensical string of words; one or more symbols, such as numerals, mathematical symbols, operation symbols, etc., that have widely and commonly accepted names; and/or any text or symbols that can either be read or described using widely and commonly accepted terms, as discussed herein, and/or as known in the art at the time of filing, and/or as developed after the time of filing.

In one embodiment, at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207 data indicating the words, and or symbols, represented in the authentication text data is stored locally, i.e., data representing a correct response is stored locally at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207.

In one embodiment, once authentication text data representing one or more words, or symbols, to be read aloud by the data access requesting party is generated at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207, process flow proceeds to TRANSFER THE AUTHENTICATION TEXT DATA TO A FIRST COMPUTING SYSTEM ASSOCIATED WITH THE DATA ACCESS REQUESTING PARTY OPERATION 209.

In one embodiment, while a copy of the authentication text data, i.e., data representing a correct response is stored locally at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207, a copy of the authentication text data of GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207 i.e., challenge data, is transferred to the first computing system associated with the data requesting party at TRANSFER THE AUTHENTICATION TEXT DATA TO A FIRST COMPUTING SYSTEM ASSOCIATED WITH THE DATA ACCESS REQUESTING PARTY OPERATION 209.

In various embodiments, the first computing system associated with the data requesting party of TRANSFER THE AUTHENTICATION TEXT DATA TO A FIRST COMPUTING SYSTEM ASSOCIATED WITH THE DATA ACCESS REQUESTING PARTY OPERATION 209 can be any computing system including a first audio capture/detection capability, i.e., a first audio detection capability, as discussed herein, and/or as known in the art at the time of filing, and/or as developed after the time of filing. In one embodiment, the first computing system is not necessarily a computing system owned by the data requesting party, controlled by the data requesting party, and/or registered with process 200 for voice match based data access authorization. All that is required of the first computing system is that the first computing system be accessible by the data requesting party.

In one embodiment, once a copy of the authentication text data of GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207 i.e., challenge data, is transferred to the first computing system associated with the data requesting party at TRANSFER THE AUTHENTICATION TEXT DATA TO A FIRST COMPUTING SYSTEM ASSOCIATED WITH THE DATA ACCESS REQUESTING PARTY OPERATION 209, process flow proceeds to DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211.

In one embodiment, once the authentication text data is transferred to the first computing system at TRANSFER THE AUTHENTICATION TEXT DATA TO A FIRST COMPUTING SYSTEM ASSOCIATED WITH THE DATA ACCESS REQUESTING PARTY OPERATION 209, the words and/or symbols represented by the authentication text data are displayed on a display device associated with the first computing system at DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211.

In one embodiment, once the words and/or symbols represented by the authentication text data are displayed on a display device associated with the first computing system at DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211, process flow proceeds to ACTIVATE A FIRST AUDIO DETECTION CAPABILITY ON THE FIRST COMPUTING SYSTEM ASSOCIATED WITH THE DATA ACCESS REQUESTING PARTY OPERATION 213.

In one embodiment, at ACTIVATE A FIRST AUDIO DETECTION CAPABILITY ON THE FIRST COMPUTING SYSTEM ASSOCIATED WITH THE DATA ACCESS REQUESTING PARTY OPERATION 213, a first audio detection capability on the first computing system of DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211 is activated.

In one embodiment, at ACTIVATE A FIRST AUDIO DETECTION CAPABILITY ON THE FIRST COMPUTING SYSTEM ASSOCIATED WITH THE DATA ACCESS REQUESTING PARTY OPERATION 213 the first audio detection capability on the first computing system is activated automatically by process 200 for voice match based data access authorization.

In other embodiments, the first audio detection capability is activated at ACTIVATE A FIRST AUDIO DETECTION CAPABILITY ON THE FIRST COMPUTING SYSTEM ASSOCIATED WITH THE DATA ACCESS REQUESTING PARTY OPERATION 213 by the data requesting party, in one embodiment, at the request of process 200 for voice match based data access authorization.

In one embodiment, once a first audio detection capability on the first computing system of DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211 is activated at ACTIVATE A FIRST AUDIO DETECTION CAPABILITY ON THE FIRST COMPUTING SYSTEM ASSOCIATED WITH THE DATA ACCESS REQUESTING PARTY OPERATION 213, process flow proceeds to ACTIVATE A SECOND AUDIO DETECTION CAPABILITY ON A SECOND COMPUTING SYSTEM ASSOCIATED WITH THE DATA ACCESS REQUESTING PARTY OPERATION 215.

In one embodiment, at ACTIVATE A SECOND AUDIO DETECTION CAPABILITY ON A SECOND COMPUTING SYSTEM ASSOCIATED WITH THE DATA ACCESS REQUESTING PARTY OPERATION 215 the data requesting party is requested to access and activate a second computing system associated with the data access requesting party and a second audio capture/detection capability, i.e., a second audio detection device associated with the second computing system.

In one embodiment, the second computing system associated with the data access requesting party of ACTIVATE A SECOND AUDIO DETECTION CAPABILITY ON A SECOND COMPUTING SYSTEM ASSOCIATED WITH THE DATA ACCESS REQUESTING PARTY OPERATION 215 is a computing system previously registered with process 200 for voice match based data access authorization.

In one embodiment, the second computing system associated with the data access requesting party of ACTIVATE A SECOND AUDIO DETECTION CAPABILITY ON A SECOND COMPUTING SYSTEM ASSOCIATED WITH THE DATA ACCESS REQUESTING PARTY OPERATION 215 is a mobile computing system, such as a smart phone, whose telephone number, and/or email address, and/or text message phone number, is already registered with, and/or known by, process 200 for voice match based data access authorization. Consequently, in these embodiments, the second computing system of ACTIVATE A SECOND AUDIO DETECTION CAPABILITY ON A SECOND COMPUTING SYSTEM ASSOCIATED WITH THE DATA ACCESS REQUESTING PARTY OPERATION 215 is known to be associated with the data access requesting party, and/or is registered with process 200 for voice match based data access authorization.

In one embodiment, the second computing system of ACTIVATE A SECOND AUDIO DETECTION CAPABILITY ON A SECOND COMPUTING SYSTEM ASSOCIATED WITH THE DATA ACCESS REQUESTING PARTY OPERATION 215 includes a second audio capture/detection capability, i.e., a second audio detection device. In one embodiment, the second audio detection capability on the second computing system associated with the data access requesting party is activated at ACTIVATE A SECOND AUDIO DETECTION CAPABILITY ON A SECOND COMPUTING SYSTEM ASSOCIATED WITH THE DATA ACCESS REQUESTING PARTY OPERATION 215.

In one embodiment, at ACTIVATE A SECOND AUDIO DETECTION CAPABILITY ON A SECOND COMPUTING SYSTEM ASSOCIATED WITH THE DATA ACCESS REQUESTING PARTY OPERATION 215 the second audio detection capability is activated automatically by process 200 for voice match based data access authorization. In other embodiments, at ACTIVATE A SECOND AUDIO DETECTION CAPABILITY ON A SECOND COMPUTING SYSTEM ASSOCIATED WITH THE DATA ACCESS REQUESTING PARTY OPERATION 215 the data requesting party is required to activate the second audio detection capability.

Consequently, in one embodiment, at ACTIVATE A SECOND AUDIO DETECTION CAPABILITY ON A SECOND COMPUTING SYSTEM ASSOCIATED WITH THE DATA ACCESS REQUESTING PARTY OPERATION 215 the words and/or symbols of the authentication text data are displayed on the first computing system and the separate audio detection capabilities associated with the first and second computing systems are activated and readied to record audio detection data.

In one embodiment, once the data requesting party is requested to access and activate a second computing system associated with the data access requesting party and a second audio capture/detection capability, i.e., a second audio detection device associated with the second computing system, at ACTIVATE A SECOND AUDIO DETECTION CAPABILITY ON A SECOND COMPUTING SYSTEM ASSOCIATED WITH THE DATA ACCESS REQUESTING PARTY OPERATION 215 process flow proceeds to REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217.

In one embodiment, at REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217 the data access requesting party is requested by process 200 for voice match based data access authorization to read aloud the one or more words, or symbols, represented by the authentication text data displayed at DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211 on the display device associated with the first computing system.

In various embodiments, the data access requesting party is requested to read aloud the one or more words, or symbols, represented by the authentication text data at REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217 via one or more pop-up displays on the display device of the first computing system, and/or an email message, and/or an SMS or other text-based message, and/or by any other means, mechanism, process, or procedure for requesting the one or more words or symbols represented by the authentication data be read aloud by the data requesting party.

In one embodiment, once the data access requesting party is requested by process 200 for voice match based data access authorization to read aloud the one or more words, or symbols, represented by the authentication text data displayed at DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211 on the display device associated with the first computing system at REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217, process flow proceeds to OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219.

In one embodiment, at OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219, as the data requesting party is reading aloud the words, and/or symbols, represented in the authentication text data in response to the request of REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217, first audio data is captured/obtained by the first audio detection capability associated with the first computing system. Likewise, as the data requesting party is reading aloud the words, and/or symbols, represented in the authentication text data in response to the request of REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217, second audio data is captured/obtained by the second audio detection capability associated with the second computing system.

In one embodiment, once first audio data is captured/obtained by the first audio detection capability associated with the first computing system and second audio data is captured/obtained by the second audio detection capability associated with the second computing system at OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219, process flow proceeds to COMPARE THE AUTHENTICATION TEXT DATA, THE FIRST AUDIO DATA, AND THE SECOND AUDIO DATA OPERATION 221.

In one embodiment, at COMPARE THE AUTHENTICATION TEXT DATA, THE FIRST AUDIO DATA, AND THE SECOND AUDIO DATA OPERATION 221 data indicating the words, and or symbols, represented in the authentication text data previously stored locally by process 200 for voice match based data access authorization at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207, the first audio data, and the second audio data, of OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219 are analyzed and compared.

In one embodiment, at COMPARE THE AUTHENTICATION TEXT DATA, THE FIRST AUDIO DATA, AND THE SECOND AUDIO DATA OPERATION 221 the first audio data and second audio data of OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219 is transferred to, or otherwise obtained by, process 200 for voice match based data access authorization.

In one embodiment, at COMPARE THE AUTHENTICATION TEXT DATA, THE FIRST AUDIO DATA, AND THE SECOND AUDIO DATA OPERATION 221 the authentication text data. e.g., data indicating the words, and or symbols, represented in the authentication text data previously stored locally by process 200 for voice match based data access authorization, the first audio data, and the second audio data, are analyzed and compared.

In one embodiment, the authentication data is compared with the first audio data at COMPARE THE AUTHENTICATION TEXT DATA, THE FIRST AUDIO DATA, AND THE SECOND AUDIO DATA OPERATION 221 and, if the first audio data matches the authentication data to a threshold degree, the first audio data is designated as authenticated first audio data. Likewise, in one embodiment the authentication data is compared with the second audio data at COMPARE THE AUTHENTICATION TEXT DATA, THE FIRST AUDIO DATA, AND THE SECOND AUDIO DATA OPERATION 221 and, if the second audio data matches the authentication data to threshold degree, the second audio data is designated as authenticated second audio data. In this embodiment, once the first audio data and second audio data are designated as authenticated audio data at COMPARE THE AUTHENTICATION TEXT DATA, THE FIRST AUDIO DATA, AND THE SECOND AUDIO DATA OPERATION 221, the status data associated with the data requesting party is transformed into status data indicating the data requesting party is an authenticated legitimate user of the protected data in the database, i.e., the data requesting party is identified as a legitimate database user.

In one embodiment, the first audio data and second audio data are compared with each other, and the authentication data, at COMPARE THE AUTHENTICATION TEXT DATA, THE FIRST AUDIO DATA, AND THE SECOND AUDIO DATA OPERATION 221 and if the first audio data, the second audio data, and the authentication data match to a threshold degree, at COMPARE THE AUTHENTICATION TEXT DATA, THE FIRST AUDIO DATA, AND THE SECOND AUDIO DATA OPERATION 221 the status data associated with the data requesting party is transformed into status data indicating the data requesting party is an authenticated legitimate user of the protected data in the database, i.e., the data requesting party is identified as a legitimate database user.

In one embodiment, the first audio data and second audio data are compared with each other at COMPARE THE AUTHENTICATION TEXT DATA, THE FIRST AUDIO DATA, AND THE SECOND AUDIO DATA OPERATION 221, and if the first audio data and the second audio data match to a threshold degree, at COMPARE THE AUTHENTICATION TEXT DATA, THE FIRST AUDIO DATA, AND THE SECOND AUDIO DATA OPERATION 221 the status data associated with the data requesting party is transformed into status data indicating the data requesting party is an authenticated legitimate user of the protected data in the database, i.e., the data requesting party is identified as a legitimate database user.

In one embodiment, once data indicating the words, and or symbols, represented in the authentication text data previously stored locally by process 200 for voice match based data access authorization at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207, the first audio data, and the second audio data, of OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219 are analyzed and compared at COMPARE THE AUTHENTICATION TEXT DATA, THE FIRST AUDIO DATA, AND THE SECOND AUDIO DATA OPERATION 221, process flow proceeds to IF THE AUTHENTICATION TEXT DATA, THE FIRST AUDIO DATA, AND THE SECOND AUDIO DATA, MATCH TO A DEFINED THRESHOLD TOLERANCE, PROVIDE THE ACCESS REQUEST COMPUTING SYSTEM ASSOCIATED WITH THE DATA REQUESTING PARTY ACCESS TO THE PROTECTED DATA IN THE DATABASE OPERATION 223.

In one embodiment, once the status data associated with the data requesting party is transformed into status data indicating the data requesting party is an authenticated legitimate user of the protected data in the database, i.e., the data requesting party is identified as a legitimate database user, at COMPARE THE AUTHENTICATION TEXT DATA, THE FIRST AUDIO DATA, AND THE SECOND AUDIO DATA OPERATION 221, the access system, and/or the identified legitimate user of the protected data in the database of COMPARE THE AUTHENTICATION TEXT DATA, THE FIRST AUDIO DATA, AND THE SECOND AUDIO DATA OPERATION 221, is provided access to the protected data in the database at IF THE AUTHENTICATION TEXT DATA, THE FIRST AUDIO DATA, AND THE SECOND AUDIO DATA, MATCH TO A DEFINED THRESHOLD TOLERANCE, PROVIDE THE ACCESS REQUEST COMPUTING SYSTEM ASSOCIATED WITH THE DATA REQUESTING PARTY ACCESS TO THE PROTECTED DATA IN THE DATABASE OPERATION 223.

On the other hand, if the data access requesting party cannot be identified as a legitimate user of the protected data in the database at COMPARE THE AUTHENTICATION TEXT DATA, THE FIRST AUDIO DATA, AND THE SECOND AUDIO DATA OPERATION 221 by any of the methods discussed above, the data requesting party is denied access to the protected data in the database at IF THE AUTHENTICATION TEXT DATA, THE FIRST AUDIO DATA, AND THE SECOND AUDIO DATA, MATCH TO A DEFINED THRESHOLD TOLERANCE, PROVIDE THE ACCESS REQUEST COMPUTING SYSTEM ASSOCI- ATED WITH THE DATA REQUESTING PARTY ACCESS TO THE PROTECTED DATA IN THE DATABASE OPERATION 223.

In one embodiment, once the access system, and/or the identified legitimate user of the protected data in the database of COMPARE THE AUTHENTICATION TEXT DATA, THE FIRST AUDIO DATA, AND THE SECOND AUDIO DATA OPERATION 221, is provided access to the protected data in the database at IF THE AUTHENTICATION TEXT DATA, THE FIRST AUDIO DATA, AND THE SECOND AUDIO DATA, MATCH TO A DEFINED THRESHOLD TOLERANCE, PROVIDE THE ACCESS REQUEST COMPUTING SYSTEM ASSOCIATED WITH THE DATA REQUESTING PARTY ACCESS TO THE PROTECTED DATA IN THE DATABASE OPERATION 223, process flow proceeds to EXIT OPERATION 230.

In one embodiment, at EXIT OPERATION 230, process 200 for voice match based data access authorization is exited to await new data.

As a specific illustrative example of one embodiment, assume that a legitimate database user has previously enrolled with process 200 for voice match based data access authorization at PROVIDE A DATABASE INCLUDING PROTECTED DATA OPERATION 203. Consequently, process 200 for voice match based data access authorization has obtained the legitimate database user's phone number associated with the legitimate database user's second computing system, in this specific illustrative example, a smart phone.

In this specific illustrative example, the database and protected data are associated with an on-line banking system and the legitimate database user wants to login to his online banking account. In this specific illustrative example, the legitimate database user visits his online banking site via his laptop, i.e., his access system, and, in this embodiment, the first computing system associated with legitimate database user. Further assume the legitimate database user clicks "log in" to view his balances. This initiates the transfer of access request data from the legitimate database user's laptop to the process system, i.e., a process/gateway server, implementing the process for voice match based data access authorization at RECEIVE ACCESS REQUEST DATA FROM AN ACCESS SYSTEM ASSOCIATED WITH A DATA ACCESS REQUESTING PARTY OPERATION 205.

At this point, the process server generates random text data represented by authentication text data in the form of the sentence "Jack and Jill went up the hill" at GENERATE AUTHENTICATION TEXT DATA REPRESENTING ONE OR MORE WORDS, OR SYMBOLS, TO BE READ ALOUD BY THE DATA ACCESS REQUESTING PARTY OPERATION 207 and, in this specific illustrative example, the authentication text data is sent to the legitimate database user's laptop display at TRANSFER THE AUTHENTICATION TEXT DATA TO A FIRST COMPUTING SYSTEM ASSOCIATED WITH THE DATA ACCESS REQUESTING PARTY OPERATION 209 and the sentence "Jack and Jill went up the hill" is displayed on the laptop display screen at DISPLAY THE ONE OR MORE WORDS, OR SYMBOLS, REPRESENTED BY THE AUTHENTICATION TEXT DATA ON A DISPLAY DEVICE ASSOCIATED WITH THE FIRST COMPUTING SYSTEM OPERATION 211.

An audio detection/capture capability associated with the laptop is then activated, e.g., the laptop's microphone is turned on, at ACTIVATE A FIRST AUDIO DETECTION CAPABILITY ON THE FIRST COMPUTING SYSTEM ASSOCIATED WITH THE DATA ACCESS REQUESTING PARTY OPERATION 213. In this specific illustrative example, a message is then sent to the legitimate database user via an SMS message sent to the smart phone associated with the legitimate database user, i.e., the second computing system associated with the legitimate database user, asking the legitimate database user to activate a second audio detection/capture capability associated with the smart phone i.e., to turn on a microphone associated with the smart phone, at ACTIVATE A SECOND AUDIO DETECTION CAPABILITY ON A SECOND COMPUTING SYSTEM ASSOCIATED WITH THE DATA ACCESS REQUESTING PARTY OPERATION 215.

In this specific illustrative example, the legitimate database user is then instructed to read the sentence "Jack and Jill went up the hill" out loud within voice range of both the first audio detection capability associated with the laptop and the second audio detection capability associated with the smart phone at REQUIRE THE DATA ACCESS REQUESTING PARTY TO READ ALOUD THE ONE OR MORE WORDS, OR SYMBOLS, REPRESENTED BY THE AUTHENTICATION TEXT DATA OPERATION 217.

In this specific illustrative example, both the first audio detection capability associated with the laptop and the second audio detection capability associated with the smart phone capture audio data representing the legitimate database user reading the sentence "Jack and Jill went up the hill" out loud at OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219.

In this specific illustrative example, the first audio data captured by the first audio detection system associated with the laptop and the second audio data captured by the second audio detection system associated with the smart phone are both transferred to a computing system, such as a server system, associated with process 200 for voice match based data access authorization at OBTAIN FIRST AUDIO DATA FROM THE FIRST AUDIO DETECTION CAPABILITY AND SECOND AUDIO DATA FROM THE SECOND AUDIO DETECTION CAPABILITY OPERATION 219.

In this specific illustrative example, the first audio data is compared with a copy of the authentication text data maintained by process 200 for voice match based data access authorization and is found to match the authentication text data at COMPARE THE AUTHENTICATION TEXT DATA, THE FIRST AUDIO DATA, AND THE SECOND AUDIO DATA OPERATION 221.

Likewise, in this specific illustrative example, the second audio data is compared with the copy of the authentication text data and found to match the authentication text data COMPARE THE AUTHENTICATION TEXT DATA, THE FIRST AUDIO DATA, AND THE SECOND AUDIO DATA OPERATION 221. Consequently, in this specific illustrative example, the first audio data and second audio data are designated as authenticated audio data at COMPARE THE AUTHENTICATION TEXT DATA, THE FIRST AUDIO DATA, AND THE SECOND AUDIO DATA OPERATION 221, and the legitimate database user is identified/authenticated, as a legitimate user of the protected data in the database at COMPARE THE AUTHENTICATION TEXT DATA, THE FIRST AUDIO DATA, AND THE SECOND AUDIO DATA OPERATION 221. Therefore, the legitimate database user is provided access to the protected data in the database at IF THE AUTHENTICATION TEXT DATA, THE FIRST AUDIO DATA, AND THE SECOND AUDIO DATA, MATCH TO A DEFINED THRESHOLD TOLERANCE, PROVIDE THE ACCESS REQUEST COMPUTING SYSTEM ASSOCIATED WITH THE DATA

REQUESTING PARTY ACCESS TO THE PROTECTED DATA IN THE DATABASE OPERATION 223

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 200 for voice match based data access authorization discussed herein, a method and system for providing multi-factor authentication is provided that does not require the use of keyed-in passcodes, is simple to use, and leverages the fact that most legitimate database users have access to two or more computing systems, and/or mobile computing systems with an audio capture/detection capability.

Consequently, using process 200 for voice match based data access authorization, data can be protected in a manner that does not place a significant burden on the legitimate database users, but has the ability to thwart the vast majority of hackers.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for voice match based data access authorization comprising the following, which when executed individually or collectively by any set of one or more processors perform a process including:
   providing a database including protected data;
   receiving access request data from an access request computing system associated with a data access requesting party, the access request data indicating a request to access the protected data by the data access requesting party;
   generating random authentication text data, the authentication text data representing one or more words, or symbols, to be read aloud by the data access requesting party;
   transferring the authentication text data to a first computing system associated with the data access requesting party;
   displaying the one or more words, or symbols, represented by the authentication text data on a display device associated with the first computing system;
   activating a first audio detection capability on the first computing system associated with the data access requesting party;
   activating a second audio detection capability on a second computing system associated with the data access requesting party;
   requiring the data access requesting party to read aloud, in a first instance, the one or more words, or symbols, represented by the authentication text data displayed on the display device associated with the first computing system;
   obtaining first audio data from the first audio detection capability on the first computing system representing the data requesting party's reading, in the first instance, the one or more words, or symbols, represented by the authentication text data aloud;
   obtaining second audio data from the second audio detection capability on the second computing system representing the data requesting party's reading, in the first instance, the one or more words, or symbols, represented by the authentication text data aloud, the obtaining of the first audio data and the obtaining of the second audio data occurring at the same time as and as a result of a single reading, in the first instance, of the one or more words or symbols represented by the authentication text: comparing each of the authentication text data, the first audio data, and the second audio data with each other and determining that individual ones of the authentication text data, the first audio data, and the second audio data, each match the other two to a defined threshold tolerance;
   providing the access request computing system associated with the data requesting party access to the protected data in the database; and
   wherein at least one of the first computing system or the second computing system is a mobile computing system.

2. The computing system implemented method for voice match based data access authorization of claim 1 wherein access request computing system is the first computing system.

3. The computing system implemented method for voice match based data access authorization of claim 1 wherein access request computing system is the second computing system.

4. The computing system implemented method for voice match based data access authorization of claim 1 wherein access request computing system is a third computing system.

5. The computing system implemented method for voice match based data access authorization of claim 1 wherein the first computing system is a smart phone.

6. The computing system implemented method for voice match based data access authorization of claim 1 wherein the second computing system is a smart phone.

7. The computing system implemented method for voice match based data access authorization of claim 1 wherein the database is associated with a data management system.

8. The computing system implemented method for voice match based data access authorization of claim 1 wherein the database is associated with a financial management system.

9. The computing system implemented method for voice match based data access authorization of claim 1 wherein the database is associated with an on-line banking system.

10. A system for voice match based data access authorization comprising:
   at least one processor; and
   at least one memory coupled to the at least one processor, the at least one memory having stored therein instructions which when executed by any set of the one or more processors, perform a process for voice match based data access authorization, the process for voice match based data access authorization including: providing a database including protected data;
   receiving access request data from an access request computing system associated with a data access requesting party, the access request data indicating a request to access the protected data by the data access requesting party;
   generating random authentication text data, the authentication text data representing one or more words, or symbols, to be read aloud by the data access requesting party;
   transferring the authentication text data to a first computing system associated with the data access requesting party;
   displaying the one or more words, or symbols, represented by the authentication text data on a display device associated with the first computing system;
   activating a first audio detection capability on the first computing system associated with the data access requesting party;
   activating a second audio detection capability on a second computing system associated with the data access requesting party;
   requiring the data access requesting party to read aloud, in a first instance, the one or more words, or symbols, represented by the authentication text data displayed on the display device associated with the first computing system;
   obtaining first audio data from the audio first detection capability on the first computing system representing the data requesting party's reading, in the first instance, the one or more words, or symbols, represented by the authentication text data aloud;

obtaining second audio data from the second audio detection capability on the second computing system representing the data requesting party's reading, in the first instance, the one or more words, or symbols, represented by the authentication text data aloud, the obtaining of the first audio data and the obtaining of the second audio data occurring at the same time as and as a result of a single reading, in the first instance, of the one or more words or symbols represented by the authentication text;

comparing each of the authentication text data, the first audio data, and the second audio data with each other and determining that individual ones of the authentication text data, the first audio data, and the second audio data, each match the other two to a defined threshold tolerance providing the access request computing system associated with the data requesting party access to the protected data in the database; and wherein at least one of the first computing system or the second computing system is a mobile computing system.

11. The system for voice match based data access authorization of claim 10 wherein the access request computing system is the first computing system.

12. The system for voice match based data access authorization of claim 10 wherein the access request computing system is the second computing system.

13. The system for voice match based data access authorization of claim 10 wherein the access request computing system is a third computing system.

14. The system for voice match based data access authorization of claim 10 wherein the first computing system is a smart phone.

15. The system for voice match based data access authorization of claim 10 wherein the second computing system is a smart phone.

16. The system for voice match based data access authorization of claim 10 wherein the database is associated with a data management system.

17. The system for voice match based data access authorization of claim 10 wherein the database is associated with a financial management system.

18. The system for voice match based data access authorization of claim 10 wherein the database is associated with an on-line banking system.

19. A system for voice match based data access authorization comprising:
  a database including protected data;
  a first computing system data access requesting party, the first computing system including a first audio detection capability;
  a second computing system data access requesting party, the second computing system including a second audio detection capability;
  at least one processor; and
  at least one memory coupled to the at least one processor, the at least one memory having stored therein instructions which when executed by any set of the one or more processors, perform a process for voice match based data access authorization, the process for voice match based data access authorization including:
  receiving access request data from an access request computing system associated with a data access requesting party, the access request data indicating a request to access the protected data by the data access requesting party;
  generating authentication text data, the authentication text data representing one or more words, or symbols, to be read aloud by the data access requesting party; transferring the authentication text data to the first computing system; displaying the one or more words, or symbols, represented by the authentication text data on a display device associated with the first computing system;
  automatically activating the first audio detection capability on the first computing system;
  activating the second audio detection capability on a second computing system;
  requiring the data access requesting party to read aloud, in a first instance, the one or more words, or symbols, represented by the authentication text data displayed on the display device associated with the first computing system;
  obtaining first audio data from the audio first detection capability on the first computing system representing the data requesting party's reading, in the first instance, the one or more words, or symbols, represented by the authentication text data aloud;
  obtaining second audio data from the second audio detection capability on the second computing system representing the data requesting party's reading, in the first instance, the one or more words, or symbols, represented by the authentication text data aloud, the obtaining of the first audio data and the obtaining of the second audio data occurring at the same time as and as a result of a single reading, in the first instance, of the one or more words or symbols represented by the authentication text:
  comparing each of the authentication text data, the first audio data, and the second audio data with each other and determining that individual ones of the authentication text data, the first audio data, and the second audio data, each match the other two to a defined threshold tolerance
  providing the access request computing system associated with the data requesting party access to the protected data in the database, and
  wherein at least one of the first computing system or the second computing system is a mobile computing system.

* * * * *